United States Patent [19]

Blatt

[11] Patent Number: 5,072,652

[45] Date of Patent: Dec. 17, 1991

[54] GRIPPING DEVICE HAVING IMPACT CUSHIONING MEANS

[76] Inventor: John A. Blatt, 22 Stratton Pl., Grosse Pointe Shores, Mich. 48236

[21] Appl. No.: 614,709

[22] Filed: Nov. 16, 1990

[51] Int. Cl.$^5$ .......................................... F01B 11/02
[52] U.S. Cl. ................... 92/85.00 R; 92/128; 92/140; 294/88; 294/115
[58] Field of Search ............ 92/85, 128, 145, 140; 267/219, 220; 294/88, 115

[56] References Cited

U.S. PATENT DOCUMENTS

| | | | |
|---|---|---|---|
| 166,273 | 8/1875 | Githens | 92/85 R |
| 818,985 | 4/1906 | Symons et al. | 92/85 R |
| 859,629 | 7/1907 | Paull | 92/85 R |
| 1,958,499 | 5/1934 | Moulton | 267/220 |
| 2,374,062 | 4/1945 | Wilcox et al. | 92/85 R |
| 2,815,992 | 12/1957 | Rodgers | 309/4 |
| 2,963,330 | 12/1960 | Arnes | 309/23 |
| 2,994,571 | 8/1961 | Péras | 309/23 |
| 3,037,781 | 6/1962 | Péras | 277/182 |
| 3,136,228 | 6/1964 | Dailey | 92/85 |
| 3,236,223 | 2/1966 | Rockwood | 92/85 R |
| 3,267,815 | 8/1966 | Ortman et al. | 91/26 |
| 3,354,794 | 11/1967 | Dailey | 92/243 |
| 3,388,638 | 6/1968 | Brinkel | 92/245 |
| 3,450,037 | 6/1969 | Lickliter et al. | 92/85 R |
| 3,465,650 | 9/1969 | Gluck | 92/85 |
| 3,913,460 | 10/1975 | Wright | 92/85 |
| 4,013,386 | 3/1977 | Hardman | 417/489 |
| 4,061,346 | 12/1977 | Coleman et al. | 277/205 |
| 4,088,061 | 5/1978 | Stoll et al. | 91/26 |
| 4,145,057 | 3/1979 | Wheeler | 277/27 |
| 4,242,946 | 1/1981 | Toliusis | 92/59 |
| 4,257,254 | 3/1981 | Adamus et al. | 72/432 |
| 4,327,924 | 5/1982 | Wheeler | 277/205 |
| 4,336,946 | 6/1982 | Wheeler | 277/211 |
| 4,409,886 | 10/1983 | Herner | 91/397 |
| 4,515,378 | 5/1985 | Marshall | 277/152 |
| 4,521,027 | 6/1985 | Marshall | 277/152 |
| 4,576,407 | 3/1986 | Lambert | 294/88 |
| 4,627,332 | 12/1986 | Furuta et al. | 92/168 |
| 4,701,113 | 10/1987 | Eickmann | 417/472 |
| 4,818,192 | 4/1989 | Korthaus | 417/372 |
| 4,825,746 | 5/1989 | Herner | 91/45 |
| 4,898,082 | 2/1990 | Pottorff | 92/132 |

FOREIGN PATENT DOCUMENTS

| | | | |
|---|---|---|---|
| 2535524 | 2/1977 | Fed. Rep. of Germany | 92/85 R |
| 845083 | 8/1939 | France | 92/85 R |
| 954080 | 12/1949 | France | 92/85 R |
| 1437218 | 11/1988 | U.S.S.R. | 294/88 |

Primary Examiner—Edward K. Look
Assistant Examiner—Thomas Denion
Attorney, Agent, or Firm—Basile and Hanlon

[57] ABSTRACT

A fluid pressure actuated clamp or gripper includes a mechanism housing mounted upon and projecting forwardly from the front end of the fluid pressure motor housing to define a passage loosely enclosing the projecting portion of the piston rod of the motor. The mechanism housing is split from front to rear into two separable halves and aligned bores through the housing halves detachably receive the opposite ends of a pivot pin upon which elements of the clamp or gripper mechanisms are mounted. A carrier fixedly mounted on the piston rod within the mechanism housing passage detachably mounts resilient bumper members engageable with the front end wall of the motor housing to define a resiliently cushioned rearward end limit of movement of the piston rod.

3 Claims, 2 Drawing Sheets 5,072,652

GRIPPING DEVICE HAVING IMPACT CUSHIONING MEANS

BACKGROUND OF THE INVENTION

The present invention is directed to an impact cushioning means utilized to cushion impact forces generated at the end of a stroke of a fluid pressure actuated motor employed to actuate an article gripping or clamping device.

Fluid pressure actuated clamping or gripping devices of the type with which the present invention is concerned are widely employed in large numbers on automated article or part handling machines to releasably grip and position a part or workpiece at a work station or to transfer a workpiece to or from a work station. These clamps or grippers typically include a fluid pressure actuated cylinder-piston type fluid motor whose piston rod is coupled by a linkage to pivot one or both of a pair of part gripping jaws between a closed part gripping position and an open part release position. In the usual case, the motor is pneumatically actuated via a four-way reversing valve so that the piston of the motor is driven in a forward or reverse stroke by full line pressure. When the piston is driven in a forward stroke, it drives the jaws to their closed position to grip the part and the forward end limit of movement of the piston is established when the part is gripped between the jaws of the device. In the case of a gripper of the type in which a pointed projection on one of the jaws is partially embedded into the workpiece to lock the workpiece against lateral displacement, the impact forces generated by closing of the jaws have a functional purpose and are acceptable.

Normally, upon opening of the jaws it is desired to have the jaws open as wide as possible to provide maximum clearance for moving the part to and from operative relationship with the opened jaws. Thus, the full stroke of the piston is normally utilized during the return or jaw opening stroke and the rearward end limit of movement of the piston typically is established by the engagement of the piston with the rearward end wall of the piston chamber. Impact at this end of the piston stroke accomplishes no useful purpose, and it is quite conventional in the prior art to mount a resilient cushioning member or bumper on the rearward face of the piston to cushion its impact with a stationary surface of the cylinder housing at its rearward end limit of movement.

While such piston mounted bumpers normally have a reasonably long service life, eventually they must be replaced, and replacement requires disconnecting the motor from its pressure source and disassembly of the motor to a point where the rearward end face of the piston is accessible for removal and replacement of the bumper.

The present invention is directed to a cushioning device for a fluid pressure actuated clamp or gripper which may be inspected or replaced without requiring disconnection of the motor from its pressure source or disassembly of the motor itself.

SUMMARY OF THE INVENTION

In accordance with the present invention, a fluid pressure actuated clamp is constructed with a three-part housing-a fluid pressure motor housing which receives the piston of the fluid motor with the piston rod projecting forwardly through the front end of the motor housing, and a two-part auxiliary or mechanism housing detachably mounted on the front end of the motor housing to mount the gripper jaws of the device and to partially enclose the jaw actuating linkage and the projecting portion of the piston rod. The mechanism housing, when assembled upon the motor housing, defines a central passage extending forwardly from the front end of the motor housing to an open front end from which the gripper jaws project. A carrier is fixedly mounted on the piston rod within this central passage, and a plurality of resilient bumper members are detachably mounted upon the carrier to project rearwardly from the carrier to resiliently engage the front end wall of the motor housing to establish a rearward end limit of movement of the piston which is slightly short of contact with the rearward end of the piston chamber.

The mechanism housing is split longitudinally into two halves and has each half part bolted separately to the front end of the motor housing. At the forward end of the mechanism housing, aligned bores in each half of the mechanism housing receive the opposite ends of a pivot pin upon which the jaws of the gripper are pivotally supported. Set screws mounted in the respective halves of the mechanism housing lock the housing halves to the opposite ends of the pivot pin. When so assembled, the linkage which couples the jaws to the piston rod, the projecting portion of the piston rod, and the carrier are all enclosed within the mechanism housing. Access to the bumper members is provided simply by loosening the pivot pin engaging set screws in the housing halves and unbolting the mechanism housing halves from the motor housing to permit separation and removal of the mechanism housing halves to provide access to the bumpers on the carrier. This does not require any disassembly or unsealing of the fluid pressure actuated motor.

Other objects and features of the invention will become apparent by reference to the following specification and to the drawings.

IN THE DRAWINGS

Figure 1:
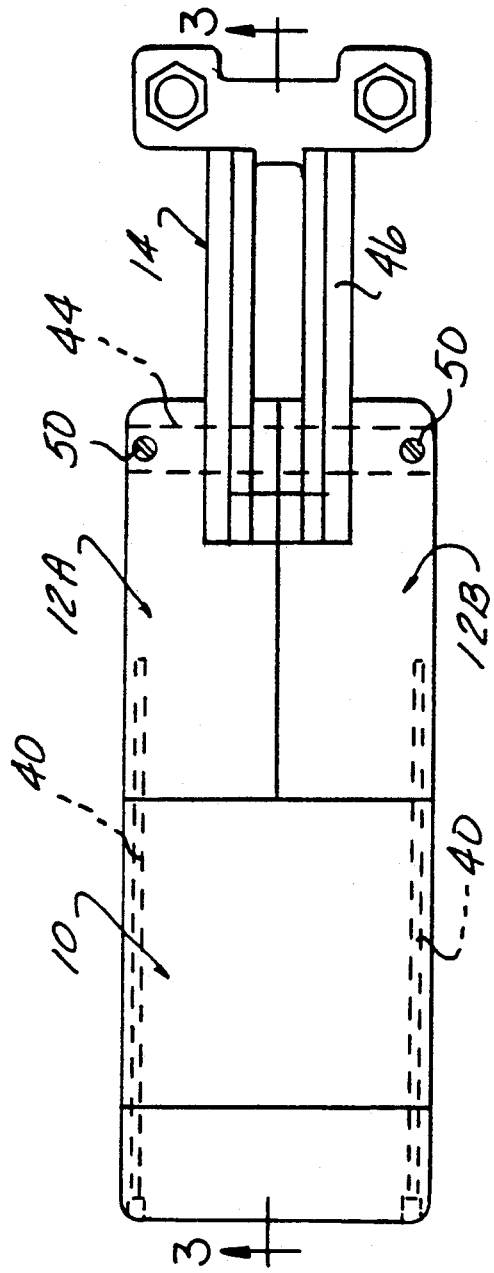
FIG. 1 is a top plan view of an assembled gripping device embodying the present invention.
Figure 2:
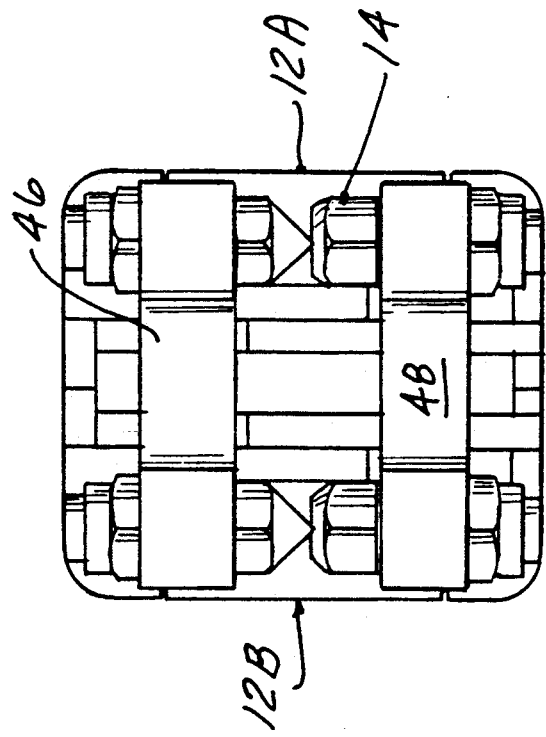
FIG. 2 is a front end view of the gripper of FIG. 1.

Referring first to FIG. 1, a gripper embodying the present invention includes a motor housing designated generally 10, a two-part mechanism housing having right and left-hand halves designated generally 12A and 12B respectively and a gripper jaw assembly mounted upon and projecting forwardly from the front (right-hand end as viewed in FIGS. 1 and 3) of the mechanism housing 12A, 12B. Motor housing 10 constitutes the housing or "cylinder" of a fluid pressure actuated motor and, as best seen in the cross-sectional view of FIG. 3 encloses an internal chamber 16 within which a piston 18 is mounted for sliding movement within chamber 16 with the periphery of the piston sealingly engaged with the walls of the chamber in a well known manner. The motor housing 10 shown in the drawings is made up of a hollow tubular main portion sealingly closed at its rearward end by a rear end cap 22 and sealingly receiving at its front end a front end plug 24 through which a piston rod 26 fixed at its rearward end to piston 18 projects forwardly through a sliding seal as at 28.

Figure 3:
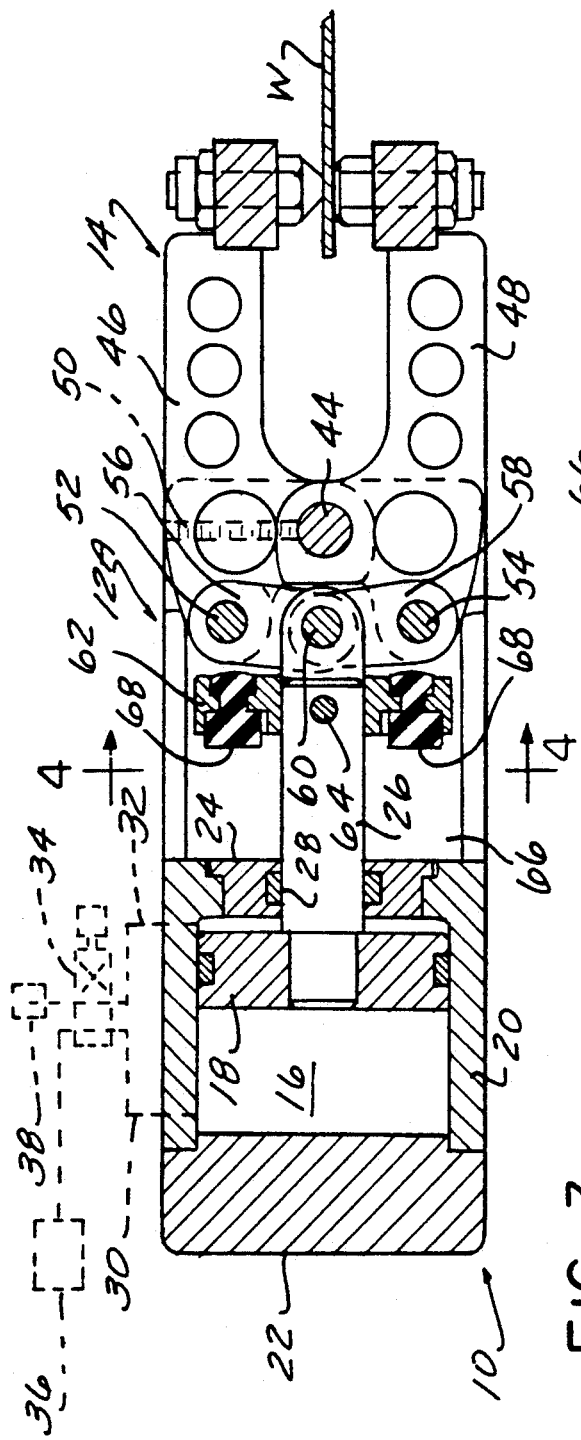
FIG. 3 is a detail cross-sectional view of the gripper of FIG. 1 taken on the line 3—3 of FIG. 1.

The opposite ends of chamber 16 are connected by fluid pressure lines schematically indicated at 30, 32 in FIG. 3 via a four-way reversing valve schematically indicated at 34 to a source of fluid pressure 36 and to a sump or vent schematically indicated at 38. The fluid pressure supply system is completely conventional and has been indicated only schematically, and functions to establish a pressure differential within chamber 16 at opposite sides of piston 18 to drive the piston in movement in either direction in accordance with the position of the reversing valve 34 in a well known manner by supplying, in the case of a pneumatic motor, air under pressure to one side of piston 18 while venting air from the opposite side of the piston.

Figure 4:
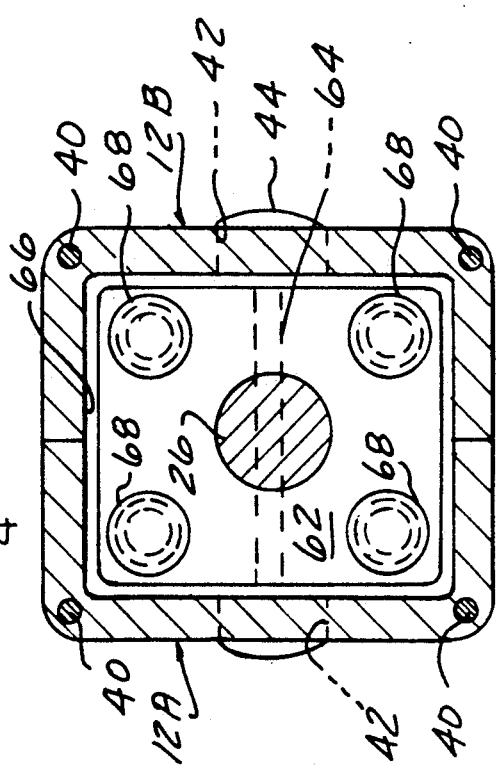
FIG. 4 is a detail cross-sectional view taken on line 4—4 of FIG. 3.

Elements 20, 22 and 24 of motor housing 10 are fixedly and sealingly secured to each other by suitable means, not shown. The two mechanism housing halves 12A and 12B are detachably mounted upon the front end of motor housing 10 as by elongate bolts 40 (FIGS. 1 and 4) which pass through the walls of housing 10 and are threadably received in tapped bores in the mechanism housing halves 12A and 12B. Near the forward ends of mechanism housing halves 12A and 12B, both halves are formed with aligned bores 42 (FIG. 4) which receive snugly the opposite ends of a pivot pin 44 upon which opposed jaws 46, 48 of the gripper are pivotally mounted. Set screws, such as 50, (FIGS. 1 and 3) may be threadably received within housing halves 12A and 12B to clamp pivot pin 44 to the respective halves of the mechanism housing. As best seen in FIG. 3, each of jaws 46 and 48 is pivotally connected as at 52, 54, to one end of respective links 56, 58, the other ends of links 56, 58 being pivotally connected by a common pivot 60 to the front end of piston rod 26.

In FIG. 3, piston 18 is shown at its extreme forward end limit of travel in which the linkage 56, 58 connected to the piston rod positions the gripper jaws 46, 48 in a closed position in which a workpiece W is gripped between the opposed jaws. Upon movement of piston 18 rearwardly or to the left from its FIG. 3 position, pivot pin 60 will likewise move with the piston rod and, in so doing, pivot jaws 46, 48 about the stationary pivot 44 to swing the distal ends of the respective jaws away from each other to a release position out of engagement with the workpiece W.

In that opening movement of the jaws 46, 48 is not limited by engagement between the jaws and a fixed surface, under normal circumstances leftward movement of piston 18 is limited only by its engagement with the rear wall of chamber 16 defined in this particular case by end cap 22. Because the leftward movement of piston 18 is in response against the full supply pressure against its front face, a substantial impact would normally result if piston 18 were driven into contact with end cap 20. To prevent this impact, in accordance with the present invention a plate-like carrier 62 is fixedly mounted upon piston rod 26 as by a pin 64 passing through aligned bores in carrier 62 and piston rod 26. The carrier is so dimensioned as to be freely movable within the central passage 66 enclosed by the assembled mechanism housing halves 12A, 12B. A plurality of resilient bumper members 68 are detachably mounted in carrier 62 to project rearwardly from the rearward surface of carrier 62. Carrier 62 is so located upon piston rod 26 that upon rearward movement of piston rod 26, the bumpers 68 on carrier 62 will engage the front end wall of motor housing 10 before piston 18 engages the rearward end wall of chamber 16. The engagement of the bumper members with the front end wall of the motor housing thus provides a resiliently cushioned rearward end limit of movement of the piston.

Figure 5:
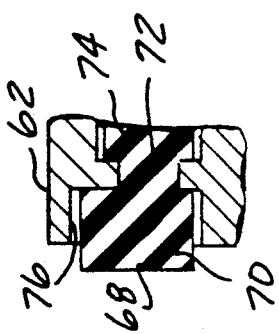
FIG. 5 is a detail drawing of the removable bumper.

Bumper members 68 are so shaped as to be detachably mounted in carrier 62. As best seen in the enlarged cross-sectional view of FIG. 5, the bumper members are formed with a relatively large diameter portion 70 at one end, a relatively small diameter central section 72, and a front end section 74 of a diameter somewhat larger than the diameter of central portion 72. The carrier member 62 is formed with stepped bores 76 of a cross sectional configuration generally conformed to that of the bumper members as best seen in FIG. 5. The bumper members possess sufficient resiliency so that they may be manually mounted on the carrier member by pressing the front end 74 of the bumper member forwardly into bore 76 until end portion 74 snaps into place as shown in FIG. 5. Removal of a bumper member for replacement is accomplished simply by forcing the bumper member rearwardly through bore 76.

To replace a bumper member once the gripper has been installed on a machine, set screws 50 are loosened to unclamp the mechanism housing halves 12A and 12B from the opposite ends of pivot pin 44. Mounting bolts 40 are then unthreaded from the mechanism housing halves 12A, 12B which can then be separated from pivot pin 44 to fully expose carrier 62 for replacement of the bumper members without requiring any disassembly of motor housing 10 or disconnection of the gripper jaws from the linkage or piston rod.

While one embodiment of the invention has been described in detail, it will be apparent to those skilled in the art the disclosed embodiment may be modified. For example, the specific configuration or proportions of the fluid pressure actuated motor, gripper jaws, etc. may take forms other than those here disclosed. Therefore, the foregoing description is to be considered exemplary, and the true scope of the invention is that defined in the following claims.

I claim:

1. A fluid pressure actuated gripper comprising:
a fluid pressure actuated cylinder-piston type motor including a piston chamber defining motor housing slidably receiving a piston for fluid pressure actuated forward and rearward movement within said chamber along a first axis, a mechanism housing, mounting means for fixedly and detachably mounting said mechanism housing on said motor housing, such that said mechanism housing extends forwardly from the front end of said motor housing, said mechanism housing having a pair of spaced opposed side walls defining opposite sides of a central passage extending through said mechanism housing from front to rear, a piston rod fixed to said piston and projecting forwardly through the front end wall of said motor housing in sliding sealed relationship therewith to a front end forwardly and rearwardly movable within said central passage, a pivot pin detachably mounted at its opposite ends in said side walls of said mechanism housing and extending across said central passage in a direction normal to said first axis, gripper jaw means pivotally mounted on said pivot pin, link means coupling said jaw means to said piston rod for pivoting said jaw means to a closed position in response to a forward movement of said rod and for pivoting said jaw means to an open position in response to a rearward movement of said rod, a carrier fixedly mounted on said rod forwardly of said front end wall, and resilient bumper means detachably mounted on said carrier and projecting rearwardly from said carrier and engageable with said front end wall to define a resiliently cushioned end limit to rearward movement of said piston within said piston chamber, said mechanism housing including two separable housing elements, one of said side walls constituting a portion of one of said elements and the other of said side walls constituting a portion of the other of said elements.

2. A fluid pressure actuated gripper comprising:

a fluid pressure actuated cylinder-piston type motor including a piston chamber defining motor housing slidably receiving a piston for fluid pressure actuated forward and rearward movement within said chamber along a first axis, a mechanism housing, mounting means for fixedly and detachably mounting said mechanism housing on said motor housing, such that said mechanism housing extends forwardly from the front end of said motor housing, said mechanism housing having a pair of spaced opposed said walls defining opposite sides of a central passage extending through said mechanism housing from front to rear, a piston rod fixed to said piston and projecting forwardly through the front end wall of said motor housing in sliding sealed relationship therewith to a front end forwardly and rearwardly movable within said central passage, a pivot pin detachably mounted at its opposite ends in said side walls of said mechanism housing and extending across said central passage in a direction normal to said first axis, gripper jaw means pivotally mounted on said pivot pin, link means coupling said jaw means to said piston rod for pivoting said jaw means to a closed position in response to a forward movement of said rod and for pivoting said jaw means to an open position in response to a rearward movement of said rod, a carrier fixedly mounted on said rod forwardly of said front end wall, and resilient bumper means detachably mounted on said carrier and projecting rearwardly from said carrier and engageable with said front end wall to define a resiliently cushioned end limit to rearward movement of said piston within said piston chamber, where said mechanism housing includes two separable housing elements, one of said side walls constituting a portion of one of said elements and the other of said side walls constituting a portion of the other of said elements, each of said elements having a bore in the side wall portion thereof for receiving one end of said pivot pin, and releasable securing means for detachably retaining each end of said pivot pin against withdrawal from the bore in which it is received.

3. A fluid pressure actuated gripper comprising:

a fluid pressure actuated cylinder-piston type motor including a piston chamber defining motor housing slidably receiving a piston for fluid pressure actuated forward and rearward movement within said chamber along a first axis, a mechanism housing, mounting means for fixedly an detachably mounting said mechanism housing on said motor housing, such that said mechanism housing extends forwardly from the front end of said motor housing, said mechanism housing having a pair of spaced opposite side walls defining opposite sides of a central passage extending through said mechanism housing from front to rear, a piston rod fixed to said piston and projecting forwardly through the front end wall of said motor housing in sliding sealed relationship therewith to a front end forwardly and rearwardly movable within said central passage, a pivot pin detachably mounted at its opposite ends in said side walls of said mechanism housing and extending across said central passage in a direction normal to said first axis, gripper jaw means pivotally mounted on said pivot pin, link means coupling said jaw means to said piston rod for pivoting said jaw means to a closed position in response to a forward movement of said rod and for pivoting said jaw means to an open position in response to a rearward movement of said rod, a carrier fixedly mounted on said rod forwardly of said front end wall, and resilient bumper means detachably mounted on said carrier and projecting rearwardly from said carrier and engageable with said front end wall to define a resiliently cushioned end limit to rearward movement of said piston within said piston chamber, wherein said mechanism housing includes a pair of motor housing halves each detachably and fixedly secured to said front end of said motor housing and projecting forwardly therefrom.

* * * * *